May 5, 1970 J. D. BALLIN ET AL 3,510,598

TELEPHONE CALL DIVERTER AND ANSWERING DEVICE

Filed Oct. 22, 1965

INVENTORS
JOSEPH D. BALLIN
EMMETT R. SALZBERG
ARTHUR M. LIEBERMAN

BY Hopgood & Calimafde
ATTORNEYS.

3,510,598
TELEPHONE CALL DIVERTER AND ANSWERING DEVICE

Joseph D. Ballin, Oceanside, N.Y., Emmett R. Salzberg, 2930 Rockaway Ave., Oceanside, N.Y. 11572, and Arthur Michael Lieberman, Scarsdale, N.Y.; said Ballin and Lieberman assignors, by direct and mesne assignments, to said Salzberg Filed Oct. 22, 1965, Ser. No. 501,054
Int. Cl. H04m 3/54, 11/04
U.S. Cl. 179—18 6 Claims

ABSTRACT OF THE DISCLOSURE

This invention provides a novel device for effecting the transfer of a call from the called telephone (Station A) to another telephone (Station B), the device having an endless recording medium bearing an "indication" of the transfer number and including means responsive to the incoming call for moving the recording medium and effecting the transfer of the incoming call to Station B. An answering message is recorded on the same medium.

Figure 1:
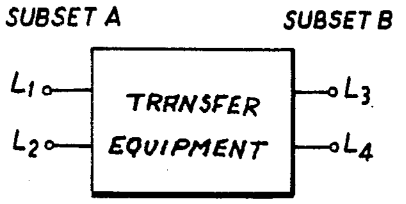

This invention relates to telephone accessory equipment in general, and in particular to a novel apparatus for answering an unattended telephone and relaying the incoming calls to a previously stored transfer number at which the subscriber, i.e., the equipment owner, is now located. The invention increases the usefulness of the telephone by combining in a single instrument the ability to:

(1) Answer each caller with a recorded message.

(2) Relay an incoming call from the called telephone to another telephone.

(3) Report an alarm condition to, for example, the police or fire department and ensure its receipt.

Conventional telephone answering devices such as that described in U.S. Pat No. 2,928,898, issued to E. R. Salzberg and D. M. Goodman provides the useful function of recording messages received during the subscriber's absence and storing these messsages for replay upon his return. Call relaying devices are also available which automatically transfer an incoming call to the equipment owner's present location.

These apparatuses, however, exhibit several inherent disadvantages. Devices of the former type do not allow an immediate receipt of the calling party's information or inquiries nor is normal two-way conversation possible. Devices of the latter type, on the other hand, do not answer each caller with a recorded message, nor do they include the capability to report an alarm condition and to do so until it is received. Moreover, the latter type devices have minimum flexibility and require the owner's return to the equipment location to institute a change in the transfer number..

The foregoing capabilities are an integral part of our invention and can be used without additional components, circuitry or complexity.

Accordingly, it is the object of this invention to provide a simple, reliable and inexpensive device which can answer each caller with a recorded message, which can be programmed to relay an incoming call to the desired distant telephone and which can report an emergency to the proper authorities.

It is a further object of this invention to provide the apparatus described in the foregoing object with the additional capability of remotely changing the prerecorded transfer number.

It is a still further object of this invention to provide the fire and/or police alarm feature with the additional provision that the alarm call repeats until answered.

It is a still further object of this invention to provide a device which may be simply and conveniently adapted to Touch Tone dialing systems.

Briefly, the invention is predicated upon a multitrack endless recording medium (e.g. a magnetic drum) upon which the transfer number (as a pulse modulating oscillation or a tone signal) and the outgoing message are stored. The recording media is cycled once in response to an incoming call and the incoming and outgoing lines are seized; the latter for initiating dial tone from conventional central office equipment. During cycling, the magnetic drum transmits the recorded message to the calling party and presents pulse modulated oscillations or tone frequencies which are utilized to "dial" over the outgoing line. The recognition of ring back and busy tones are employed to couple the incoming and outgoing lines and to simultaneously set up disconnect logic; the latter being rendered effective in response to dial tone which, as a normal central office function, follows a predetermintd time after the calling party hangs up.. Alteration of the transfer number is effected by inhibiting the call transfer operation and activating the recording operation in response to a predetermined signal. The new transfer number is recorded in response to dial clicks or tone signals effected by physically dialing over the connected line.

Figure 2A:
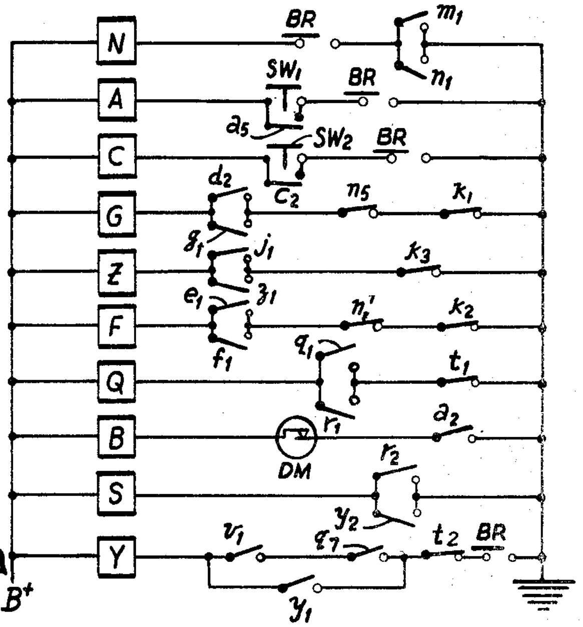
Figure 2:
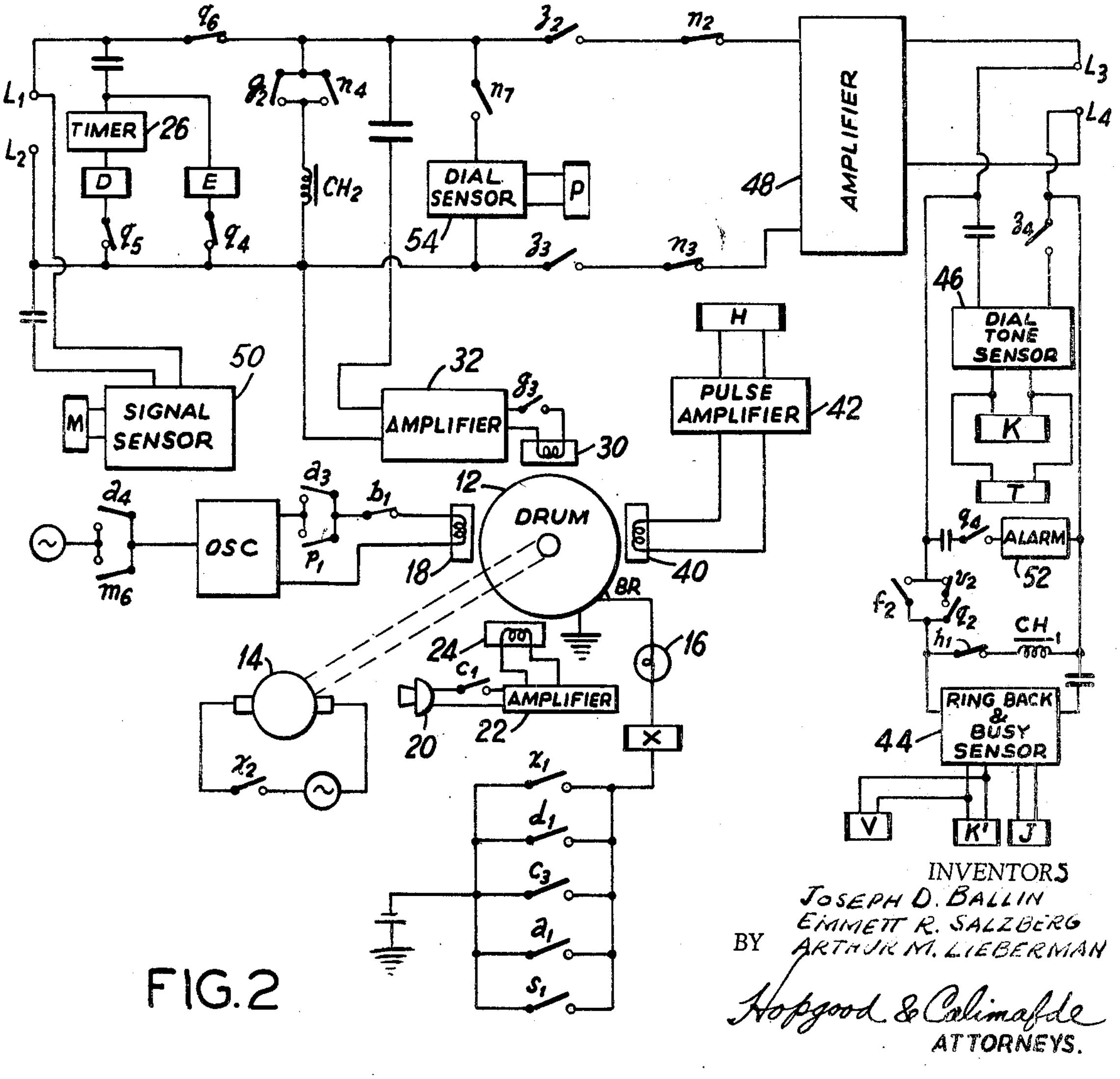

The above mentioned and other features and objects of this invention and the manner of attaining them will become more apparent and the invention itself will best be understood by reference to the following description of an embodiment of the invention taken in conjunction with the accompanying drawings wherein:

FIG. 1 illustrated in block form the relationship of the incoming and outgoing lines to the inventive apparatus; and FIGS. 2 and 2*a* show in block schematic form one embodiment of the invention; the majority of the relays being segregated in FIG. 2*a* for clarity.

In the following description, single capital letters will be employed to designate the relays; small letters and numeral subscripts will identify their associated contacts. With some exception, and in order to avoid cluttering the drawings and expedite the finding of referenced elements, electric sources as well as the switches coupling these sources to the related circuits have been omitted from the figures. Needless to say, when the functional requisites so demand, the needed circuits may be energized by contacts associated with corresponding function relays. Preferably, circuits such as the frequency sensitive circuits, amplifiers, etc. are solid state, in which case little power will be expended by allowing the circuits to remain continuously energized. If tube circuits are employed, preferably the filaments remain heated with plate voltages being applied when the particular circuit is to be rendered operational.

Turning now to the figures, the invention will now be described in detail. Topic headlines will be employed to introduce the operation under consideration. The switch contacts are depicted in their normal or unenergized condition and in order to simplify the description it is directed to telephone equipment of the dial pulse (as opposed to dial frequency) type. It will be understood, however, that the basic invention contemplated covers both systems.

DIALING IN THE NUMBER TO WHICH THE CALL IS TO BE TRANSFERRED (TRANSFER NUMBER)

When a subscriber leaves the location of the equipment, the transfer number is recorded preferably by utilizing a conventional dialing mechanism such as that denoted by DM (FIG. 2*a*). To initiate the storage of the transfer number, switch $SW_1$ is depressed, energizing relay A through a brush contact BR, riding a conducting segment on the recording drum 12 (FIG. 2). This conducting segment embraces approximately 330° of the drum periphery and is grounded as shown. It is employed to ensure the drum cycles only once and for various control functions as will be explained.

Energization of relay A, which is self held via contact $a_5$, closes normally open contact $a_1$ (FIG. 2), thereby energizing relay X which is self-held via contact $x_1$. Contact $x_2$ of this relay energizes motor 14, thereby angularly displacing the drum through suitable transmission means (not shown). Upon the light indication 16, the equipment owner operates dial DM. Relay B (FIG. 2*a*), which was energized upon the dropping of relay A, is now pulsatingly or intermittently deenergized upon each return of the dial mechanism (the conventional dial opening and closing on the return stroke). The number of deenergization pulses coincide with the dial number fingered. Each dial impulse (open) releases contact $b_1$ to its normally closed condition and applies the output of oscillator OSC (which was turned on by the $a_4$ contact of the A relay) to the drum 12 via the transducer 18. The stored indication is thus the oscillator output as modulated by the dial impulses.

When the drum conducting segment break is reached, relays A and B release, and light 16 turns off, indicating that if at this time the transfer has not been completed, switch $SW_1$ must be depressed again and the number redialed. Relay X is a slow release relay and is timed to carry the drum conducting segment past the break to again contact the brush BR, restoring the circuit to its initial condition. Switch $SW_1$ is preferably a push button which makes contact only long enough for the A relay to pick up.

RECORDING THE ANSWERING MESSAGE

In order for the calling party to be informed that there will be a slight delay while the call is transferred, drum 12 includes a parallel storage track for recording a message to this effect. Message-record is initiated by the depression of a switch $SW_2$ which functions similarly to switch $SW_1$ and energizes relay C via the drum brush-conductor segment engagement, thereby instituting drum rotation (see contact $c_3$). The message is stored on this track by speaking into the microphone 20, the output of which is fed to the recording transducer 24 via amplifier 22 and contact $c_1$.

As before, light 16 gives an indication of the end of the recording track, and again the motor 14 (by virtue of the slow release of the relay X) carries the drum conducting segment past the break, where it contacts the brush for the next function.

At this juncture, it bears mentioning that the shown position of transducers 18, 24, 30 and 40 is for purposes of illustration. The exact disposition of each is a matter of choice and it may prove desirable to utilize the same transducing head for more than one function. In this case, of course, suitable switching would have to be provided. Further, while for simplicity erase circuits have been omitted, it is to be understood by those skilled in the art that these are made available for their conventional function on recording phases. The microphone and dial mechanisms may, if desired, be tapped off the available telephone subset components.

DETECTING THE INCOMING CALL

An incoming call is sensed by ringing-current-responsive relays D and E, the former of which exhibits a time delayed response by virtue of a timer 26. Alternatively, this relay may be of the slow drop type. Energization of relay E drops relay F (FIG. 2*a*) which is self held by contact $f_1$. Contact $f_2$ of this relay seizes the outgoing line $L_3$, $L_4$ via a choke shunt $CH_1$, thereby stimulating the central office line finder (not shown). Line seizure is the establishment of "DC current continuity" at the subscriber end; a condition which is sensed by the central office equipment for various purposes known to the art. Timer 26 introduces a delay (e.g. 5 seconds) sufficient for dial tone to appear over line $L_3$, $L_4$. When this time has elapsed, relay D drops, energizing relay X via contact $d_1$ and starting drum rotation. Simultaneously, relay G, which is self held by contact $g_1$, is energized. Contact $g_2$ of this relay places line holding shunt $CH_2$ in parallel with incoming line $L_1$, $L_2$, thereby seizing and holding this line.

The previously recorded message is now picked off the drum 12 by the transducer 30 and fed over the incoming line $L_1$, $L_2$, via the amplifier 32. Coincident therewith, transducer 40 applies the stored pulses, representing the transfer number, to the pulse amplifier and shaper 42. The output of this circuit (42) energizes a pulsing relay H, contact $h_1$ of which opens the outgoing line $L_3$, $L_4$ for each impulse; thereby dialing the recorded number (dialing will be defined herein to cover both manual and effective dialing as above).

As before, after one complete cycle, the drum 12 stops. The number having been dialed, the circuit now awaits ring back or busy over lines $L_3$, $L_4$. This is sensed by a ring back and busy sensing circuit 44 which energizes a relay J. Contest $j_1$ of this relay energizes the line connecting relay Z, which is self-held by contact $z_1$. Simultaneously, contact $z_4$ closes, activating a disconnect sensor which includes the dial tone circuit 46 and relays K and T. Amplifier 48 is provided where necessary and may include DC blocking and decoupling capacitors (not shown).

DISCONNECT

When the called and calling party finish their conversation, each will disconnect at their respective ends. Approximately one minute thereafter, and by virtue of central office equipment characteristics, dial tone will appear over lines $L_1$, $L_2$ and $L_3$, $L_4$. Dial tone will also appear when either end disconnects at the line associated with that end. Accordingly, while the embodiment chosen describes dial tone sensing at the outgoing end, it will be appreciated that sensing may either take place concurrently at the incoming end or primarily at the incoming end. The aforementioned tone is sensed by the frequency sensitive dial tone sensing circuit 46 which energizes relay K, contacts $k_1$ and $k_2$ of which release the line holding circuit relays G and F, as well as the line connecting relay Z. When relay Z releases, dial tone vanishes and relay K releases, restoring the circuit to its initial condition.

An earlier release than that just described is afforded by a second winding K' on the relay K. This winding is connected to a ring back and busy sensor and is energized after one minute of ring back or five seconds of busy tone. To effect this result, circuit 44 may include time delay relays (not shown) on the K' winding output connection.

REMOTE TRANSFER NUMBER ALTERATION

When the equipment owner desires to remotely change the transfer number recorded on the drum 12, he dials his own number and the circuits respond as before. When the D relay drops, he will hear the ring-back tone disappear. At this time he energizes a portable audio oscillator (which could consist of merely a whistle), the frequency of which is sensed by a circuit 50 which in turn energizes relay M. Contact $m_1$ of this relay energizes relay N which is self-held via contact $n_1$. Normally closed contact $n'$ in series with relay F opens, releasing this relay and hence the outgoing line holding circuit (line $L_3$, $L_4$, therefore dropping out due to contacts $f_2$ opening). Normally closed contacts $n_2$ and $n_3$ further decouple this line from line $L_1$, $L_2$. Contact $n_5$ releases the line holding relay G, however, contact $g_2$ of this relay is replaced in the incoming line holding circuit by contact $n_4$, thereby reaffirming the hold condition. Relay G preferably has a slightly delayed release to facilitate the take-over by relay N. Release of relay G also breaks the transponded message path (via contact $g_3$), giving an audible indication of the operability in response to the remotely initiated signal.

All of the foregoing takes place a fraction of a second following the receipt of the incoming signal. The drum has been angularly displaced slightly due to the relay drop time plus the delay occasioned by the time lag in sending the special signal upon hearing the ring-back vanish. Accordingly, initial storage should include a commensurate delay to allow for this time lag. This delay may be introduced manually by the operator delaying the dial-in for a few seconds after seeing the light (upon initial storage) or automatically by placing a time delay relay in the light current path.

The operator at his remote location now operates his local dial, the impulses of which are sensed by the dial sensor 54 which energizes relay P in response thereto. Contact $p_1$ of this relay modulates the oscillator and storage takes place as before. Alternatively to the foregoing, the operator might apply any combination of signals to the line which may be sensed and decoded to actuate relay P (this naturally includes tone sensing).

When the drum has gone one revolution, relay N releases, dropping lines $L_1$, $L_2$ and restoring the circuits. If the new number has not been recorded by this time, the telephone circuit to the equipment must be reestablished from start.

ALARM

An automatic alarm system is incorporated for fire, burglary, etc. in the equipment owner's absence. It may also be employed to achieve the same result in his presence and a manual burglary push button may, for example, be included at the equipment location. In the latter case, the recorded transfer number would have to pertain to someone who would recognize the purport of the received signal.

In the equipment owner's absence, the fire or burglary device (not shown) instantaneously closes a responsive contact $r_1$ (FIG. 2*a*) energizing the Q relay which is self held by contact $q_1$. Contact $q_2$ of this relay seizes lines $L_3$, $L_4$ for dial tone. After sufficient time to obtain dial tone, a slow drop relay S responds to alarm contact $r_2$ and drum rotation commences. Incoming lines $L_1$, $L_2$, as well as the call recognizing relays D and E are disabled by contacts $q_4$ through $q_6$. The outgoing number is now dialed as before.

If answered, a superposed audio frequency alarm 52 (which was set off and put on line by the Q relay) indicates to the equipment owner at his transfer location the condition which actuated the device. Two separate frequencies may be used for fire and burglary or the single frequency may be used to indicate either or both. When the owner hangs up at the remote location, dial tone is sensed as before (relay J having actuated relay Z0 and this time relay T (FIG. 2) releases the energized relay Q (by contact $t_1$), thereby releasing the holding circuits and restoring the equipment.

In the event that the line is busy or unanswered, relay V is energized after a predetermined time (see the de-Q is still energized, and the brush is contacting the conducting segment, relay Y drops and is self-held. Meanwhile, contact $v_2$ of relay V has opened the line to disconnect; when ring back or busy disappears, relay V returns contact $v_2$ to its normally closed condition, reinitiating dial tone. Contact $y_2$ of relay Y reenergizes relay S starting the drum for the second time, and the call is sent out again. This repeats until answered and dial tone appears (indicating the called party has hung up). Only at this time do contacts $t_1$ and $t_2$ open, restoring the equipment.

Should the equipment owner be home, he may utilize an auxiliary push button in parallel with the alarm contact $r_1$ and $r_2$. The preset transfer number would then relate to someone who would recognize the transmitted alarm (as mentioned). Alternatively, a third message track could be activated (not shown) to put a message on the line. For example, a police station may be called and the message may give the address of the equipment and the circumstance setting off the alarm. In this case, a switchover would have to be provided for recording on this track vis-a-vis the outgoing message track previously discussed.

While we have described above the principles of our invention in connection with specific apparatus, it is to be clearly understood that this description is made only by way of example and not as a limitation to the scope of our invention as set forth in teh objects thereof and in the accompanying claims, for example, and without limitation, while relays are shown and described, each could be replaced by a solid state switch, the drum could be replaced by an endless tape, etc. Further, with the advent of Touch Tone or frequency dialing, the system may, as mentioned, be simply modified by means well known to those skilled in the art and the transfer number dial frequencies stored on the recording media. For example, a frequency or tone signal synthesizer or Touch Tone transmitter may be substituted for the described dial mechanism with minor modification to the relay circuits.

We claim:

1. In an automatic call forwarding system for a subscriber's telephone installation having a first and a second line to the central exchange comprising, in combination, (a) a first signal detector coupled to said first line and responsive to incoming ringing signals thereon,
(b) first switching means actuated by operation of said first signal detector to close the circuit of said second line,
(c) a second signal detector responsive to dial tone on said second line,
(d) a dialing impulse generator for transmitting a pre-selected sequence of dialing pulses over said second line and
(e) a second switching means coupling said first and second lines for transmission of voice signals therebetween following operation of said dialing impulse generator, the improvement comprising:

(f) magnetic storage means in said dialing impulse generator, and
(g) means for storing said pre-selected series of dialing pulses within said magnetic storage means.

2. The combination of claim 1 including means responsive to remote control signals transmitted over one of said lines for rendering said magnetic storage means responsive to the receipt of a new series of dialing impulses.

3. The combination of claim 2 including means for coupling dialing impulses transmitted over one of said lines into said magnetic storage means thereby to store the said new series of dialing impulses.

4. The combination of claim 1 including the improvement comprising:

(f) means for transmitting over said first line an announcement message simultaneous with the transmission over said second line of the series of dialing pulses.

5. The combination of claim 4 including an endless recording medium for storage of said announcement message and for storage of a sequence of signals representative of the dialing impulses to be transmitted over said second line.

6. The combination of claim 3 including the improvement comprising:

(f) means for transmitting over said first line an announcement message simultaneously with the transmission over said second line of the series of dialing pulses.

References Cited

UNITED STATES PATENTS

| | | | |
|---|---|---|---|
| 1,759,190 | 5/1930 | Friendly | 179—18 |
| 2,555,714 | 6/1951 | Talbot | 179—5 |
| 2,928,898 | 3/1960 | Salzberg et al. | 179—6 |
| 3,188,392 | 6/1965 | Ferrell | 179—5 |
| 3,268,666 | 8/1966 | Odom | 179—18 |
| 3,287,500 | 11/1966 | Moore | 179—5 |
| 3,310,629 | 3/1967 | Yamamoto et al. | 179—6 |
| 3,301,961 | 1/1967 | Odom | 179—18 |

WILLIAM C. COOPER, Primary Examiner

U.S. Cl. X.R.

179—5, 6

UNITED STATES PATENT OFFICE
CERTIFICATE OF CORRECTION

Patent No. 3,510,598 May 5, 1970

Joseph D. Ballin et al.

It is certified that error appears in the above identified patent and that said Letters Patent are hereby corrected as shown below:

In the heading to the specification, line 4, "Oceanside" should read -- Wantogh --; line 5, "2930 Rockaway Ave., Oceanside, N. Y. 11572" should read -- P.O. Box 26, Roslyn Heights, N.Y. 11577 --.

Signed and sealed this 5th day of January 1971.

(SEAL)
Attest:

Edward M. Fletcher, Jr.
Attesting Officer

WILLIAM E. SCHUYLER, JR.
Commissioner of Patents